United States Patent [19]
Chatagnier

[11] 4,081,990
[45] Apr. 4, 1978

[54] HYDRAULIC PIPE TESTING APPARATUS
[76] Inventor: John C. Chatagnier, 704 Glendale Ave., Houma, La. 70360
[21] Appl. No.: 755,266
[22] Filed: Dec. 29, 1976
[51] Int. Cl.² .................. G01M 3/28; E21B 33/124
[52] U.S. Cl. ........................... 73/40.5 R; 73/49.1; 166/187; 166/191
[58] Field of Search .............. 73/40.5 R, 49.1, 49.5, 73/49.8; 166/187, 191

[56] References Cited
U.S. PATENT DOCUMENTS

| | | | |
|---|---|---|---|
| 2,998,721 | 9/1961 | Gawlik | 73/49.1 |
| 3,165,918 | 1/1965 | Loomis | 73/40.5 R |
| 3,215,205 | 11/1965 | Sizer | 166/187 X |
| 3,420,095 | 1/1969 | Brown et al. | 73/40.5 R |
| 3,659,648 | 5/1972 | Cobbs | 166/191 X |
| 3,899,920 | 8/1975 | Matherne | 73/40.5 R |

Primary Examiner—Richard C. Queisser
Assistant Examiner—John S. Appleman
Attorney, Agent, or Firm—Keaty & Garvey

[57] ABSTRACT

An apparatus for the hydrostatic testing of pipe and pipe connections is provided. The apparatus features an elongated tool body which can be inserted into the interior portion of a connected series of pipe joints or the like. The device is inserted into a pipe joint in proximity to a connection between two joints which has been "made up" by means of, for example, a threaded connection. The device utilizes a pair of expanding flexible packing seals which expand and sealably contact the pipe wall forming a pressure test area between the seals and at the pipe joint to be tested. Fluid pressure supplied through a central conduit in the tool body flows into the pipe between the packing seals through a nozzle injector in the tool body in proximity to the joint which is to be tested. The test fluid then first expands the pair of flexible seals and fills the pipe with water upon which a desired test pressure is exerted. The apparatus utilizes a single source of test fluid to both expand the seals which close off the central test area therebetween, and to apply the necessary "fill" water which pressurizes the test area between the seals and thus pressure tests the desired joint.

15 Claims, 7 Drawing Figures

HYDRAULIC PIPE TESTING APPARATUS

BACKGROUND OF THE INVENTION

1. Field of the Invention

The present invention relates to pipe testing, and more particularly relates to a method and apparatus for the testing of connected pipe joints by the application of interior hydrostatic pressure.

2. General Background and Prior Art

In the oil and gas, as well as related industries, it is desirable to utilize pipe and pipelines for the transmission of products on the interior portion thereof either from wells and the like or from production platforms to central points of collection.

Often pressure within pipelines through which liquids are transmitted are, by design or otherwise, excessively high. Therefore, a need exists for a device which can quickly inspect and test under pressure a pipeline or like conduit through which fluids under pressure are to be transmitted. It is especially important that the joints between sequential pipe sections be tested. This is true because the quality of individual pipe sections is substantially well controlled during manufacture. Therefore, hydrostatic pressure performance characteristics are quite predictable, resulting from strict manufacturing techniques. However, the individual joints are generally field connected under less exact conditions and require a much closer inspection before actual use. Under field conditions, pipes can become abused or simply are not connected properly, thus needing adequate testing before operation. It is to this problem that the present invention is directed.

Several devices have been patented which have attempted to provide a device for the testing of pipes and connected pipe joints. The following table lists some devices which have been patented.

| | Prior Art Patents | |
|---|---|---|
| U.S. Pat. No. | Inventor(s) | Issue Date |
| 2,998,721 | P.A. Gawlik | Sept. 5, 1961 |
| 3,038,542 | G.L. Loomis | June 12, 1962 |
| 3,173,290 | G.E. Conover | Mar. 16, 1965 |
| 3,199,598 | G.L. Loomis | Aug. 10, 1965 |
| 3,333,459 | J.R. Claycomb | Aug. 1, 1967 |
| 3,354,697 | J.P. Wilkerson | Nov. 28, 1967 |
| 3,420,095 | N.F. Brown, et al | Jan. 7, 1969 |
| 3,899,920 | C.J. Matherne | Aug. 19, 1975 |

Some of the devices of the prior art utilize a hydraulically activated "piston" which pushes against a rubber "packing seal", thereby compressing the seal, and expanding it to effect a seal between the tool and the pipe diameter. Two of these "packing seals" are then utilized on a single testing device to form a fluid tight test chamber between the seals at the joint to be tested. Several problems have been experienced with this type of sealing device. The packing seals, being made generally of a rubber or other synthetic flexible material, sometimes "run" over the edges of the sleeves which act to compress the seals themselves. This happens because the seal or packer itself is only being pushed by one piston, and is thus urged away from its location on the tool body.

Another problem is that the seals can only expand a certain distance, and thus cannot be used with some larger diameter pipe sizes. Many times the "packer" effects a seal of the pipe, but the rubber or synthetic material, in "running" over the edge of the sleeve causes the device to become stuck inside the pipe it is testing. This is especially true where a tool is used to test a pipe which is larger than what it can normally test. Thus, it can be seen that with a given tool, only a small variety of sizes can be tested.

Another problem of the devices of the prior art relate to the replacement of damaged parts. Since pipe testers of the present type utilize two packing seals which form water tight seals on either side of a joint to be "tested", it can readily be seen that the failure of one "seal" renders the entire device ineffective.

The present invention solves all these prior art problems and shortcomings in a simple but effective manner. In the present invention, there are provided packing seals which are longer than the prior art devices, and are compressed with two hydraulically activated pistons on a single packing seal. Additionally, the rubber packing seals are bonded to the metal on which they are mounted, thus reducing the chance for "run over" of the packing material on top of the piston, thus jamming the device inside the pipe to be tested.

The use of two pistons operating on a single rubber seal permits the device of the present invention to be utilized in a variety of pipe diameters, substantially larger than could be tested by similarly sized devices of the prior art. Since two pistons act simultaneously on one packer, the packer is not "urged" away from its location on the tool body, thus further reducing the chance for "run over".

Additionally, the interface of the piston and packer is an angular interface, with the piston edge coverably overlapping the packer to further reduce run over when the pipe testing apparatus of the present invention provides tool sections having packing seals which are interchangeable. Thus if either seal on a particular tool is damaged, it can be readily replaced with a single tool body section having a seal thereon which could function as either the upper or lower seal for the entire apparatus.

GENERAL DISCUSSION OF THE PRESENT INVENTION

The present invention provides an apparatus for the hydrostatic testing of pipes and pipe joints. The apparatus of the present invention utilizes a first packing seal and a second packing seal which can be placed on opposite sides of a joint to be tested. After placement of the device, the seals are activated simultaneously with internal filling of the pipe with supplied fluid. Addition of fluid under pressure to the device fills interior chambers which urge pairs of sliding pistons respectively toward each other and the packing sleeve mounted therebetween. As the inner fluid is added, the pistons proceed toward one another and expand the flexible packing sleeve therebetween. The sleeve diameter increases, and effects a substantially fluid tight seal with the pipe walls within which the device is mounted. In the preferred embodiment, each packing sleeve is provided with a pair of sliding pistons which are urged in cooperation toward each other and thus expand the two packing sleeves simultaneously.

Simultaneous to the addition of fluid to the pistons which expand the packing seals, a fluid is dispensed to the space between the seals and thus effects the hydrostatic head on the inner pipe portion proximate to the joint which is desired to be tested.

Thus, increases in pressure for the purpose of testing a given joint, effects a simultaneous increase in pressure on the sliding pistons and thus increases the sealing characteristics of each of the two packing seals.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
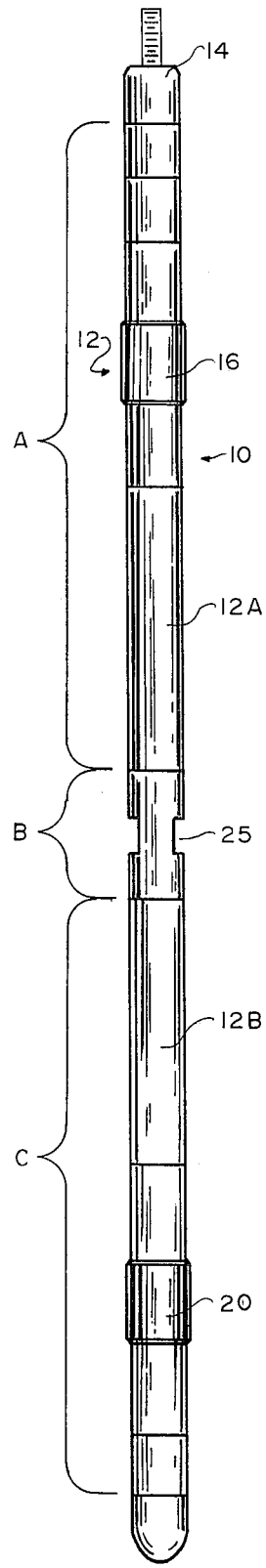
FIG. 1 is a front view of the preferred embodiment of the apparatus of the present invention, illustrating upper section "A" adjacent to a first packing seal, middle section "B" nearest the nozzle injector and lower section "C" adjacent a second packing seal.

FIGS. 1 through 4 illustrate the preferred embodiment of the present invention. As can best be seen by FIGS. 1 and 2, the pipe testing apparatus of the present invention designated generally by the numeral 10 is comprised generally of an elongated body portion 12 which is attachable at top assembly 14 to a conventional type hoist which has attached fluid supply lines (not shown) through which hydrostatic testing fluid can be supplied at head portion 14 to the main fluid channel 3 of the apparatus of the present invention 10.

For purposes of illustration, FIG. 1 is divided into three sectors, A, B and C. Sector A represents upper tool body 12a and its associated first packing seal 16. Sector B illustrates the nozzle injector body 25. Sector C illustrates lower tool body 12b upon which lower packing seal 20 is mounted and associated therewith. It should be understood that upper tool body 12a and lower tool body 12b are provided with threaded connections at their end portions, and are virtually identical and interchangeable. Thus, the tool 10 pictured in FIG. 1 could be disassembled by threadably removing pilot 33 and head portion 14, then threadably removing each tool body portion 12a, 12b from nozzle injector body 25. At that time, either tool body section 12a or 12b could be used in either the upper or lower section of the tool once the pilot 33 and head section 14 were replaced.

Figure 2:
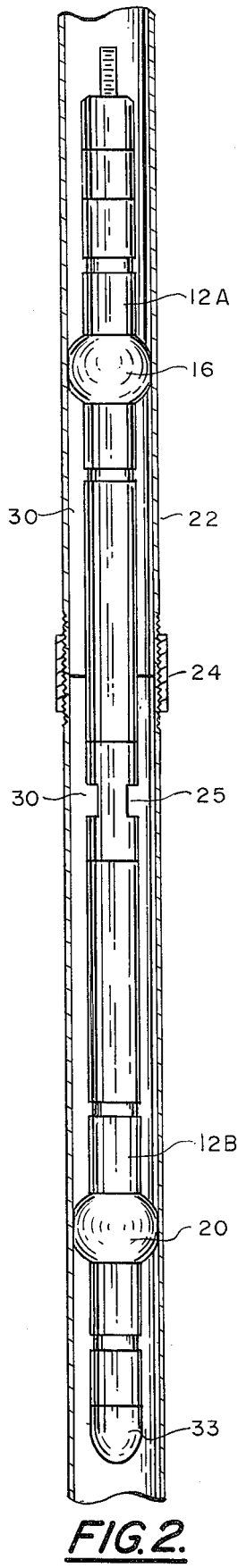
FIG. 2 is a sectional view of a pipe joint and associated pipe sections illustrating the operating position of the apparatus of the present invention therein.

As can best be seen in FIG. 2, the apparatus of the present invention 10 is lowered into a pipe line or like conduit which is comprised of a series of connected pipe joints. The connection between each of the separate sections 22 is designated by the numeral 24 in FIG. 2. Joint 24 can be any type of conventional pipe joint, which is associated with, for example, drill pipe, casing or tubing. The connection illustrated in FIG. 2 is a threaded pipe connection. However, it should be understood that the apparatus of the present invention can be utilized in any type of piping system which can be tested using hydrostatic pressure applied to the area of the joint, or other desired spot to be pressure tested.

FIG. 2 illustrates the placement of the apparatus of the present invention 10 within the pipe section and joints 22, 24. Tool pilot 33 aids to guide the device 10 into a pipe joint to be tested. The device 10 is so placed that upper packing seal 16 and lower packing seal 20 fall on opposite sides of the joint, creating a hydrostatic test chamber 30 therebetween. It is the application of water or like hydrostatic testing media to the area of test chamber 30 between seals 16, 20 which applies pressure in terms of a given test pounds per square inch which effects a strain on joint 24 and thus effects a testing thereof. When fluid is introduced to chamber 30, and a test pressure established, any leaks will be visually ascertainable at the outer portions of joint 24.

Figure 6:
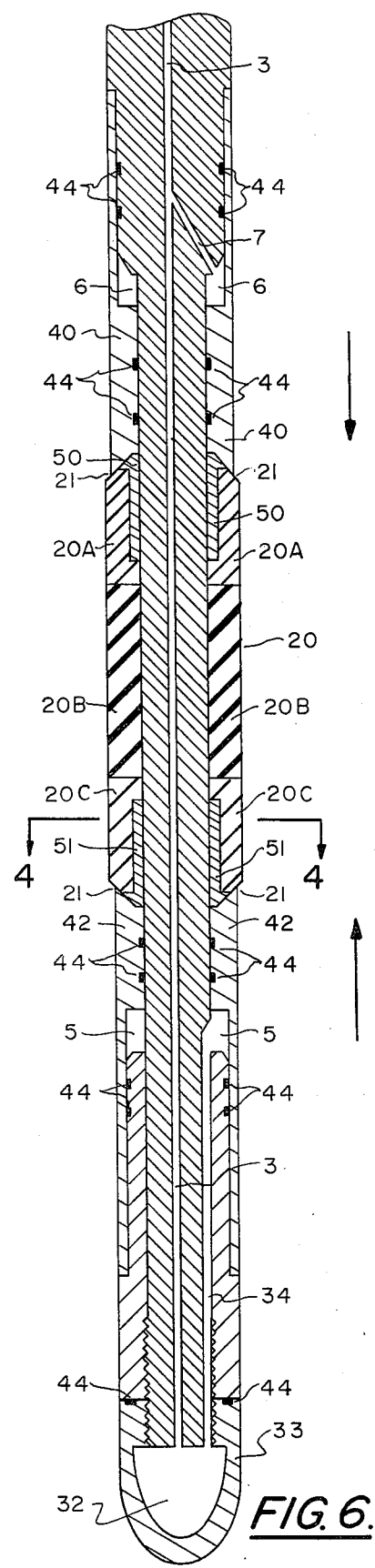
FIG. 6 is a sectional view of the preferred embodiment of the apparatus of the present invention nearest the second packing seal, designated as section C in FIG. 1.

FIG. 6 provides a detailed illustration of the lower tool body 12C and its associated operative packing seal 20. As mentioned previously, lower tool body 12C would be substantially identical in structure to and interchangeable with upper tool body 12A. As can be seen by FIG. 6, hydrostatic test fluid is supplied for operation of the apparatus of the present invention 10 through a main fluid channel 3. Fluid through channel 3 travels and fills both interior and exterior sliding sleeve chambers 6, 5 respectively. Interior sliding sleeve chamber 6 is filled with test fluid through sleeve fluid channel 7. Fluid is supplied to exterior sliding sleeve chamber 5 through main fluid channel 3, then into exterior bottom volume velocity chamber 32, whereupon the fluid enters exterior bottom fluid channel 34 and then flows into exterior sliding sleeve chamber 5. As the flow of test fluid increases in chambers 5, 6 exterior and interior sliding pistons 40, 42 respectively are urged (see arrows, FIG. 6) toward each other thereby compressing lower packing seal 20 therebetween. This movement of pistons 40, 42 toward each other thereby compressing seal 20, causes seal 20 to contract in length but increase in diameter. It is this expansion which effects a seal between packing seal 20 and the wall portion of the pipe joint 22 in which the device 10 of the present invention is mounted (See FIG. 2).

Figure 7:
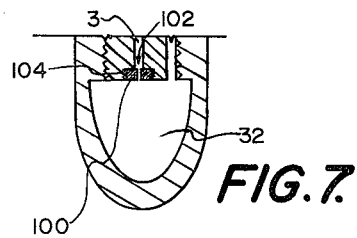
FIG. 7 is a sectional view of an alternative embodiment of the apparatus of the present invention illustrating the reduced orifice in the main fluid channel used to restrict the rate of flow to the lower sliding sleeve seal chamber.
Figure 3:
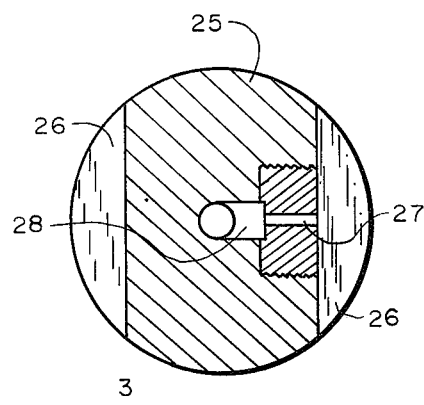
FIG. 3 is a sectional view taken along lines 3—3 of FIG. 5.
Figure 4:
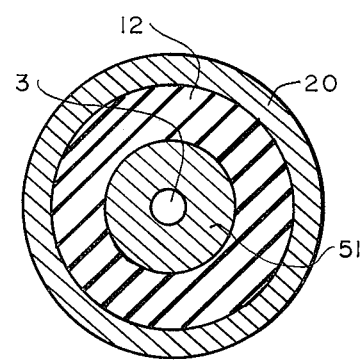
FIG. 4 is a sectional view taken along lines 4—4 of FIG. 6.

FIG. 7 shows an alternative embodiment of the fluid channel 3 as it flows into bottom volume velocity chamber 32. In the alternative embodiment, as is shown in FIG. 7, a plug 100 is provided at the point of discharge of fluid channel 3 into bottom volume velocity chamber 32. Plug 100 is provided with a reduced diameter orifice 102 which reduces the amount of flow which can enter bottom velocity chamber 32 through channel 3 at a given time. The orifice 102 would probably have a diameter larger than the orifice in nozzle injector 27 but smaller than that of main fluid channel 3. It can be seen from the above that fluid will first fill main fluid channel 3 and sleeve chamber 6 before fluid begins to flow more rapidly into bottom volume velocity chamber 32. This is because the diameter of sleeve fluid channel 7 is substantially the same as that of main fluid channel 3 and flow will proceed rapidly therethrough. The reduced diameters of orifice 102 and nozzle injector 27 prevent fluid from rapidly entering these openings before sliding chamber 6 is filled. Once chamber 6 is filled, fluid will begin to flow more rapidly into bottom volume velocity chamber 32, bottom fluid channel 34 and bottom sliding sleeve chamber 5. This flow will be in greater volume than the flow through nozzle 27 since the orifice opening 102 will be slightly larger than that opening of nozzle injector 27. Thus, test fluid will not enter chamber 30 until sleeve chamber 5 has become completely filled with fluid and lower seal 20 begins to enlarge.

Plug 100 having orifice 102 therein could be for example, a threaded connection as is best illustrated in FIG. 7 by the numeral 104. The use of plug 100 and orifice 102 has a function in that it slows down escape of test fluid from the bottom seal of the tool after a test when the pressure is relieved. In such a high pressure test, if the bottom seal releases first, there can be a build up of gas pressure in the space between the bottom portion of the tool, the pipe and a column of mud in the hole in some instances where specific testing is being done on a drill pipe casing. This pressure which developes between the mud within the casing and the top seal could cause the tool to be blown out of the casing itself. By restricting the escape of test fluid for the lower section when the pressure is released, the plug with the orifice will retard the braking of the lower seal till after the upper seal 16 has relaxed and thus prevent a high pressure build-up of test fluid between the upper seal and the lower portion of the tool between the tool and drilling mud which would be between the tool and the seals in the casing.

Lower packing sleeve 20 is comprised of three separate sections, designated by the numerals 20A, 20B and 20C in FIG. 6. The central section 20B is preferably a softer consistency material than that of exterior sections 20A and 20C. It is the soft central portion 20B which undergoes greatest expansion and provides most of the sealing contact with the adjacent pipewall 22. Sections 20A and 20C are substantially identical, and are preferably manufactured of a harder consistency material than section 20B.

Outer sections 20A and 20C have a 45° angle outer beveled edge 21 as can best be seen in FIG. 6. This outer beveled edge correspondingly abuts a similar 45° beveled edge provided on each piston 40, 42 respectively. Additionally provided are 45° vulcanized sleeve guides 50, 51 which interface with the inner portions of pistons 40. As can best be seen in FIG. 6 a 45° angle connection is formed with pistons 40, 42 abut flow control sleeves 21 and attached vulcanized sleeve guides 50, 51. This 45° connection and the bonding of packing sleeve 20 to sleeve guides 50, 51 prevents "run over" of the rubber or like resilient material, which comprises packing seal 20, onto pistons 40, 42.

Additionally, packing seal 20 is preferably bonded to tool body 12 (preferably a structural metal such as steel or the like) as an additional guard against "run over". Pistons 40, 41 can be provided with O-rings 44 as needed for effecting a substantially fluid tight seal.

The configuration of upper tool body 12a, designated as Sector A in FIG. 1 is substantially identical in operation to the operation of lower tool body 12B as was described more fully above. Thus, upper packing seal 16 is provided with a pair of pistons similar to pistons 40, 41 in FIG. 6 which expand under hydrostatic pressure to compress upper packing seal 16 and thus effect expansion thereof and a corresponding seal with the side wall of pipe joint 22.

Upper and lower tool bodies 12A, 12B can be substantially identical, such that either could suffice to provide a packing seal as necessary to the upper or lower portion of the apparatus of the present invention 10.

Thus, if tool pilot 33 were removed from lower tool body 12B and tool head portion 14 were removed from upper tool body 12A, the two remaining sections, one containing upper packing seal 16, the other providing lower packing seal 20 would be substantially identical and interchangeable. Thus, replacement packing seals in the form of tool body sections 12A, 12B could be substantially identical and threadably mounted at thread connection 60 to nozzle injector body 25 as a body section 12A, 12B is added to nozzle injector body 25, a head portion 14 or tool pilot 33 would be threadably mounted to the opposite portion thereof as needed.

Figure 5:
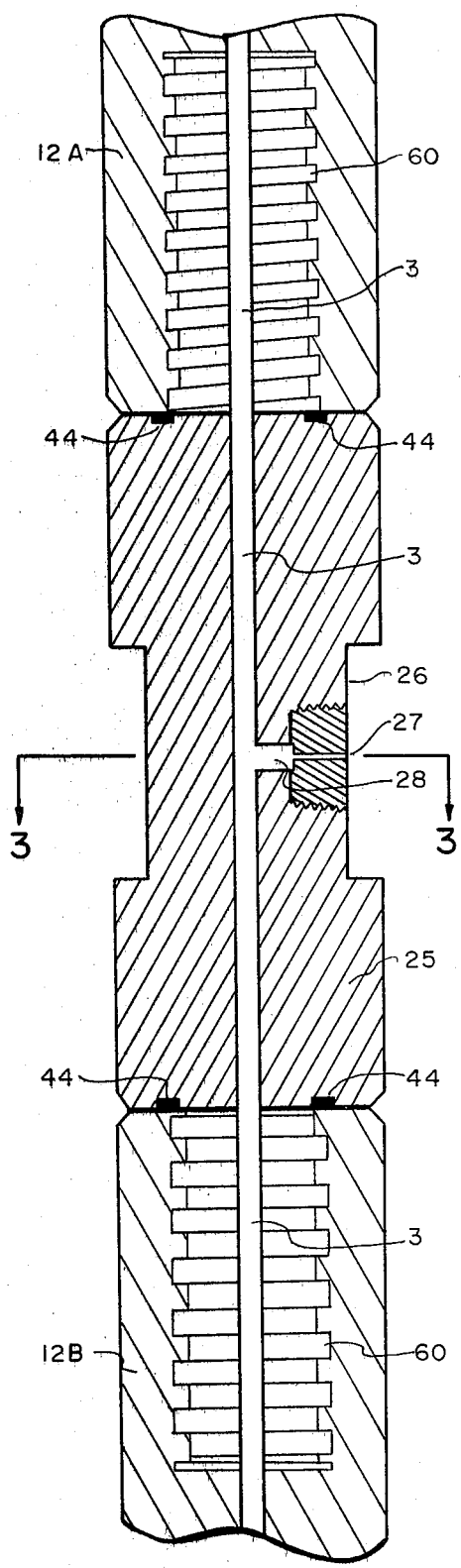
FIG. 5 is a partial sectional view of the injection nozzle portion of the preferred embodiment of the present invention, designated as section B in FIG. 1.

FIG. 5 illustrates nozzle injector 27 through which water or like hydrostatic test fluid is injected into test space 30 so that pressure as desired can be applied to joint 24 and a hydrostatic test performed thereon. As can best be seen by FIG. 5, test fluid is supplied through main fluid channel 3 where it exits through nozzle injector 28 into nozzle injector 27 and then through nozzle break out slot 26 where it is dispersed to test space 30 between upper packing seal 16 and lower packing seal 20. Nozzle injector 27 can be threadably mounted in injector body 25 as is illustrated in FIG. 5. Thus, separate nozzles having different orifices and flow characteristics can be interchangeably placed in or removed from injector body 25 as needed to accomodate different test fluids. Injector body 25 can be supplied with threaded connection 60 at its end portions, which end portions connect to upper tool body 12A and lower tool body 12B.

OPERATION

FIG. 2 best illustrates the operation of the preferred embodiment of the apparatus of the present invention. The apparatus can be used with any type of pipe, casing or tubing, especially that which is associated in drilling operations and the like. Although the apparatus of the present invention was designed primarily for the use in testing of drill pipe (for example, from 3 inch drill pipe to 6 inch diameter drill pipe), tubing (for example, 1¼ inch − 2⅞ inch diameter) and casing (for example, 13 inch − 15 inch), the device is suitable for testing any type of joint connecting two sections of virtually any type of pipe. Only changes in dimensions and engineering are necessary to adapt the apparatus and teachings of the present invention to virtually any hydrostatic pipe testing situation.

To operate the apparatus of the present invention 10, the device is connected to any conventional type hoisting machine or like device and lowered into the pipe section to be tested. The device can be connected to a conventional "overshot head" (not shown) which threadably engages the head portion 14 of the testing tool 10. The device is lowered into the pipe a distance which places upper seal and lower seal 16, 20 respectively on either side of the joint to be tested, thereby creating a test space 30 therebetween, when seals 16, 20 are expanded. The distance which the device must be lowered into a pipe can be premeasured and the lowering cable marked with a flag or other suitable indicator. The overshot head (not shown) is capable of threadably engaging and thereby suspending the tool body 12 and also has connections for conveying the test fluid into the main fluid channel 3 of the tool 10.

When the testing tool 10 is in position (with seals 16, 20 on either side of joint 24), water is introduced into the device through main fluid channel 3. The flow of water into channel 3 will fill chambers 5 and 6. Additionally, water beings to enter test space 30 through nozzle injector 27. Since nozzle injector 27 is a relatively small aperature as compared with fluid channels 7, 34, it can be seen that fluid channels 5, 6 will fill with test fluid first and begin to exert pressure on seals 16, 20 thereby expanding seals 16, 20 to seal off test area 30. After seals 16, 20 expand and meet resistance with pipe wall 22, fluid will begin to flow more rapidly through nozzle injector 27 into test chamber 30. After a period of time, dependant on the rate of flow of the fluid into the pipe testing device 10 through fluid channel 3, the entire test chamber 30 will be completely filled with test fluid and the hydrostatic pressure in the chamber 30 between seals 16, 20 will begin to rise. As can be seen by FIG. 6 and with a knowledge of the foregoing discussion, it can readily be seen that increases in hydrostatic pressure in fluid chamber 5, 6 will cause pistons 40, 42 to exert greater and greater pressure on seals 16, 20 thus making a tighter and tighter seal between the seals 16, 20 and the pipe wall 22. Thus, any desired test pressure can be placed in the device by simply reading a gauge installed on the line which feeds test fluid to the pipe testing device 10. This pressure will be virtually identical in fluid chambers 5, 6 and in hydrostatic test chamber 30.

With the preferred embodiment of the apparatus of the present invention 10, pressures from 2,000 to 3,000 PSI have been easily achieved. However, the apparatus could be used for much higher pressures with changes in engineering details to thereby test pipe joints at pressures as high as 15,000 PSI.

During the testing procedure, if a leak is noticed at joint 24, normally (as is standard in the industry) the pressure would be relieved, the device removed and the joint inspected. At that time, the device may be retightened using a higher torque or the joint itself replaced or reworked.

With the present device, there is provided a hydrostatic pipe testing device 10 which has interchangeable sections and can be utilized to test virtually any type or size of pipe and the connecting joints.

It should be understood that the term "test fluid" as used herein denotes any type of suitable fluid which can be used to apply high pressure within test chamber 30. Although water is used in the preferred embodiment, other fluids besides water could be used such as gaseous fluids, air, and the like.

Because many varying and different embodiments may be taught within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A pipe testing apparatus, comprising:
  a. an elongated body attachable to a source of pressurized hydraulic fluid, said body being insertable into the inner portion of a section of pipe to be tested;
  b. a pair of seal means on said body for forming substantially fluid tight pressurized seals between said body and the walls of a pipe in which said testing apparatus is placed, each of said seal means being a flexible expandable section of said body and said flexible expandable section is compressed by the action of a pair of hydraulic pistons cooperatively connected to said flexible section, said pistons being slideable on said elongated body, and said pistons being simultaneously urged towards said flexible expandable section when pressurized fluid is conveyed to said pipe testing apparatus;
  c. nozzle injector means on said body between said pair of seal means for introducing pressurized fluid into the space created between said pair of seal means when said seal means are activated by the introduction of pressurized fluid into said body, said nozzle injector means comprising a reduced orifice opening in said elongated body;
  d. channel means in said body for simultaneously transmitting pressurized fluid to said nozzle injector means and to said pair of seal means; and
  e. a plurality of fluid conduits providing a fluid connection between said channel means and each of said hydraulic pistons, the pressure of fluid within said channel means and each of said fluid conduits being substantially the same whereby each of said hydraulic pistons is urged to expand its respective flexible expandable section with substantially equal force.

2. The apparatus of claim 1, wherein said nozzle orifice hydraulically connects said channel means and the outer face of said body.

3. The apparatus of claim 2, wherein there is further provided within said channel means reduced section means for limiting the rate of flow of fluid through said channel means to one of said seal means.

4. The apparatus of claim 3, wherein said reduced diameter orifice has a diameter greater than the diameter of said nozzle injector means and smaller than the diameter of said channel means.

5. The apparatus of claim 1, wherein said body is comprised of a plurality of sealably connectable sections, each of said seal means forming one of said connectable sections.

6. The apparatus of claim 5, wherein said nozzle injector means forms one of said connectable sections.

7. The apparatus of claim 5, wherein said each of said seal means is substantially identical and interchangeable with the other of said seal means.

8. The apparatus of claim 5, wherein said plurality of connectable sections are threadably connectable.

9. The apparatus of claim 5, wherein there are three of said sealably connectable sections, two of said connectable sections are said seal means, and one of said connectable sections is said nozzle injector means.

10. The apparatus of claim 1, wherein said body is comprised of a plurality of sealably connectable sections, and said nozzle injector means forms one of said connectable sections.

11. The apparatus of claim 1, wherein said nozzle hydraulically connects said channel means and the outer face of said body, and said reduced orifice has a smaller diameter than the diameter of said fluid conduits.

12. The apparatus of claim 1 wherein there is further provided within said channel means reduced section means for limiting the rate of flow of fluid through said channel means to one of said seal means.

13. The apparatus of claim 12, wherein said reduced section means is a plug provided with a reduced diameter orifice therein, and said plug is insertable within said channel means between said nozzle injector means and the seal means fartherest from the point of attachment of said source of pressurized fluid to said elongated body.

14. The apparatus of claim 13 wherein said reduced diameter orifice has a diamter greater than the diameter of said nozzle injector means and smaller than the diameter of said channel means.

15. A pipe testing apparatus, comprising:
   a. an elongated body attachable to a source of pressurized hydraulic fluid, said body being insertable into the inner portion of a section of pipe to be tested;
   b. a pair of seal means on said body for forming substantially fluid tight pressurized seals between said body and the walls of a pipe in which said testing apparatus is placed, each of said seal means being activated respectively by pressurized fluid transmitted to a pair of hydraulic pistons, and said pair of seal means are activated to form the pressurized fluid tight seal when said pair of hydraulic type pistons are simultaneously urged toward each other, compressing each of said seal means respectively therebetween;
   c. a central fluid conveying conduit in said body for transmitting pressurized fluid throughout the length of said body;
   d. nozzle injector means on said body between said pair of seal means for introducing pressurized fluid into the space created between said pair of seal means when said seal means are activated by the introduction of pressurized fluid into said body, said nozzle injector means providing a reduced orifice perforation in said body, which perforation hydraulically connects said fluid conduit and the outer face of said body;
   e. a plug provided with a reduced diameter orifice, said plug insertable within said fluid conduit between said nozzle injector means and the end portion of said tool body opposite the point of attachment of said source of pressurized fluid, the diameter of said reduced diameter orifice having a diameter greater than the diameter of said nozzle injector means and smaller than the diameter of said fluid channel.

* * * * *